(12) United States Patent
Nguyen et al.

(10) Patent No.: US 7,516,354 B2
(45) Date of Patent: Apr. 7, 2009

(54) STORING PARITY INFORMATION FOR DATA RECOVERY

(75) Inventors: Lu Nguyen, Silver Spring, MD (US); Neena A. Cherian, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 591 days.

(21) Appl. No.: 10/925,825

(22) Filed: Aug. 25, 2004

(65) Prior Publication Data
US 2006/0047896 A1 Mar. 2, 2006

(51) Int. Cl.
G06F 11/00 (2006.01)
G06F 11/10 (2006.01)

(52) U.S. Cl. .......................................... 714/6; 711/114
(58) Field of Classification Search .................. 714/6; 711/114
See application file for complete search history.

(56) References Cited

U.S. PATENT DOCUMENTS

| | | | |
|---|---|---|---|
| 5,495,607 A | 2/1996 | Pisello et al. | |
| 5,673,382 A | 9/1997 | Cannon et al. | |
| 6,173,415 B1 | 1/2001 | Litwin et al. | |
| 6,178,521 B1 | 1/2001 | Filgate | |
| 6,209,002 B1 | 3/2001 | Gagne et al. | |
| 6,226,651 B1 | 5/2001 | Masuda et al. | |
| 6,389,552 B1 | 5/2002 | Hamilton et al. | |
| 6,553,401 B1 | 4/2003 | Carter et al. | |
| 6,725,392 B1* | 4/2004 | Frey et al. | 714/6 |
| 6,961,868 B2* | 11/2005 | Tormasov et al. | 714/6 |
| 7,194,656 B2* | 3/2007 | Hayward | 714/6 |
| 7,328,305 B2* | 2/2008 | Kleiman et al. | 711/114 |
| 7,353,423 B2* | 4/2008 | Hartline et al. | 714/6 |
| 7,386,663 B2* | 6/2008 | Cousins | 711/114 |
| 2001/0044879 A1* | 11/2001 | Moulton et al. | 711/114 |
| 2002/0194526 A1* | 12/2002 | Ulrich et al. | 714/6 |
| 2003/0005355 A1 | 1/2003 | Yanai et al. | |
| 2003/0051111 A1 | 3/2003 | Nakano et al. | |
| 2003/0105829 A1 | 6/2003 | Hayward | |
| 2004/0153639 A1* | 8/2004 | Cherian et al. | 713/2 |
| 2004/0225775 A1* | 11/2004 | Pellegrino et al. | 710/200 |
| 2005/0071710 A1* | 3/2005 | Micka et al. | 714/6 |

OTHER PUBLICATIONS

Storage Area Network Fundamentals by Meeta Gupta Published by Cisco Press, Apr. 18, 2002.*
Wikipedia's Exclusive or found at http://en.wikipedia.org/wiki/Xor.*
RAID 3, Striping with Dedicated Parity found at http://wiki.emdstorage.com/RAID/RAID3.*

* cited by examiner

*Primary Examiner*—Scott T. Baderman
*Assistant Examiner*—Joseph Schell
(74) *Attorney, Agent, or Firm*—Rabindranath Dutta; Konrad Raynes & Victor LLP

(57) ABSTRACT

Provided is a method in which data is received at the first storage unit. A first information unit, a second information unit, and a third information unit are generated, wherein the first information unit, the second information unit, and the third information unit each include a portion of the received data and computed parity data. The first information unit is stored in the first storage unit at the first site. The second information unit is distributed to the second storage unit at the second site for storage. The third information unit is distributed to the third storage unit at the third site for storage.

7 Claims, 8 Drawing Sheets

STORING PARITY INFORMATION FOR DATA RECOVERY

BACKGROUND

1. Field

The disclosure relates to a method, system, and article of manufacture for storing parity information for data recovery.

2. Background

Information technology systems, including storage systems, may need protection from site disasters or outages, where outages may be planned or unplanned. Furthermore, information technology systems may require features for data migration, data backup, or data duplication. Implementations for disaster or outage recovery, data migration, data backup, and data duplication may include mirroring or copying of data in storage systems. Such mirroring or copying of data may involve interactions among hosts, storage systems and connecting networking components of the information technology system Information technology systems may be protected from site outages by copying data from a first site to a second site. The first site may be referred to as an application site, a local site, a primary site or a production site. The second site may be referred to as a recovery site, a remote site, a secondary site or a backup site.

Redundant Array of Independent Disks (RAID) is a mechanism for making disks fault tolerant for disaster recovery in a disk storage system. RAID may use an error correction code, known as parity, to recover from single point of failure errors, i.e., the failure of a single disk. RAID may stripe the data and parity across a plurality of disks to improve the speed of data retrieval and at the same time allow for fault tolerance. There are number of different RAID levels, such as, RAID level 0, 1, 2, 3, 4, 5. For example, RAID level 5 provides data striping at the byte level and also provides stripe error correction information. In RAID level 5, the parity corresponding to data on a plurality of disks may be computed and the parity may be used to recover from a disk failure without losing any data.

SUMMARY OF THE DESCRIBED EMBODIMENTS

Provided are a method, system, and article of manufacture in which a first storage unit at a first site is coupled to a second storage unit at a second site and a third storage unit at a third site. Data is received at the first storage unit. The received data is divided into a first part and a second part. The first part of the data is stored in the first storage unit at the first site. The second part of the data is distributed to the second storage unit at the second site for storage. Parity data corresponding to the first part of the data and the second part of the data is computed. The parity data is distributed to the third storage unit at the third site for storage.

In additional embodiments, in response to a data loss at the first site, the first part of the data is recovered from the second part of the data stored at the second site and the parity data stored at the third site. In further embodiments, a sum of a size of the first part of the data, the second part of the data, and the parity data is less than two times the received data size. In still further embodiments, the sum of the size of the first part of the data, the second part of the data, and the parity data is one and a half times the received data size.

In yet additional embodiments, the first site, the second site, and the third site are separated from each other by a distance of over ten miles, and wherein the first part, the second part, and the third part are stored in different storage disk systems.

In further embodiments, the distance between the first site and the third site is less than the distance between the first site and the second site.

In yet additional embodiments, the first storage unit includes a cache. The received data is stored in the cache in the first storage unit. Prior to dividing the received data, updates are received to the data stored in the cache. The cache is updated with the received updates, wherein distributing the second part of the data and the parity data are performed asynchronously, and wherein the first part of the data, the second part of the data, and the parity data are timestamped.

In still further embodiment, the first storage unit is coupled to a host that sends Input/Output requests to the first storage unit, wherein an update from the host to the first storage unit is asynchronously reflected at the second storage unit and asynchronously reflected at the third storage unit.

Provided further are a method, system, and article of manufacture, wherein a first storage unit at a first site is coupled to a second storage unit at a second site and a third storage unit at a third site. A first information unit, a second information unit, and a third information unit are generated, wherein the first information unit, the second information unit, and the third information unit each include a portion of the received data and computed parity data. The first information unit is stored in the first storage unit at the first site. The second information unit is distributed to the second storage unit at the second site for storage. The third information unit is distributed to the third storage unit at the third site for storage.

In further embodiments, in response to a data loss at the first site, the received data is recovered from the second information unit and the third information unit. In further embodiments, a sum of a size of the first information unit, the second information unit, and the third information unit is less than two times the received data size.

In additional embodiments, the first site, the second site, and the third site are separated from each other by a distance of over ten miles, and wherein the first information unit, the second information unit, and the third information unit are stored in different storage disk systems.

In yet additional embodiments, a majority of the parity data is stored in the first storage unit, wherein the first storage unit is accessible faster than the second and third storage units.

In still further embodiments, the data is received at the first storage unit from a host, and wherein multi-pathing hardware is used to connect the host to the first, second, and third storage units.

In further embodiments, distributing the second and third information units is via write operations from the first storage unit to the second and third storage units, and wherein the write operations from the first storage unit to the second and third storage units are full stride writes that are written in parallel to the second and third storage units.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Figure 1A:
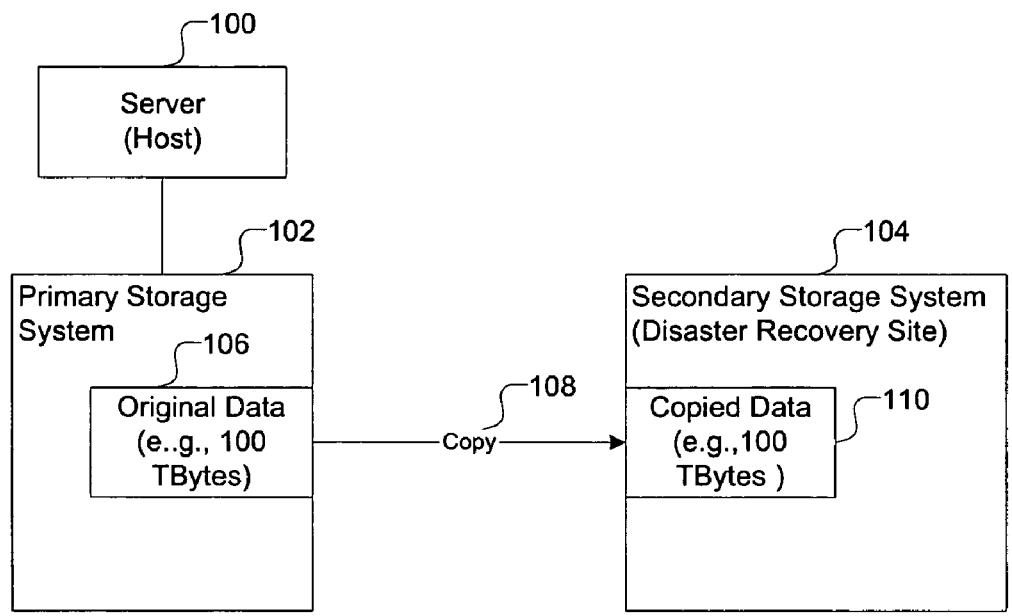
FIG. 1a illustrates a block diagram of a system to copy data from a primary storage system to a secondary storage system.

FIG. 1 illustrates a block diagram of a system to copy data from one storage system to another for disaster recovery. A server, such as, a host 100, may send data to be written to a primary storage system 102 that is coupled to a secondary storage system 104. The data written to the primary storage system 102 by the host 100 may be referred to as original data 106. For example, the size of the original data 106 may be a hundred terabytes. For maintaining a system that allows for recovery from data loss in the primary storage system 102, the primary storage system 102 may copy 108 the original data 106 to the secondary storage system 104. The data copied to the secondary storage system 104 may be referred to as copied data 110. In the event of a loss of any part of the original data 106, the copied data 110 may be used to recover from the loss. If the size of the original data 106 is hundred terabytes, then the size of the copied data 110 may also be a hundred terabytes, and the system shown in FIG. 1 may use two hundred terabytes of storage to recover from a loss in the original data 106. In the system illustrated in FIG. 1, the amount of storage required for recovering from data loss is twice the size of the original data 106. After the initial copying of the original data 106 from the primary storage system 102 to the secondary storage system 104, subsequent writes may also be copied. When the host 100 writes to a volume on the primary storage system 102, the primary storage system 102 writes the corresponding data to the local storage, such as, disks, associated with the primary storage system 102, and forwards the data to the secondary storage system 104, The secondary storage system 104 writes the forwarded data to the local storage associated with the secondary storage system 104. Once the secondary storage system 104 acknowledges to the primary storage system 102 that the write was successful, the primary storage system 102 responds to the host 100 that the write was successful.

Figure 1B:
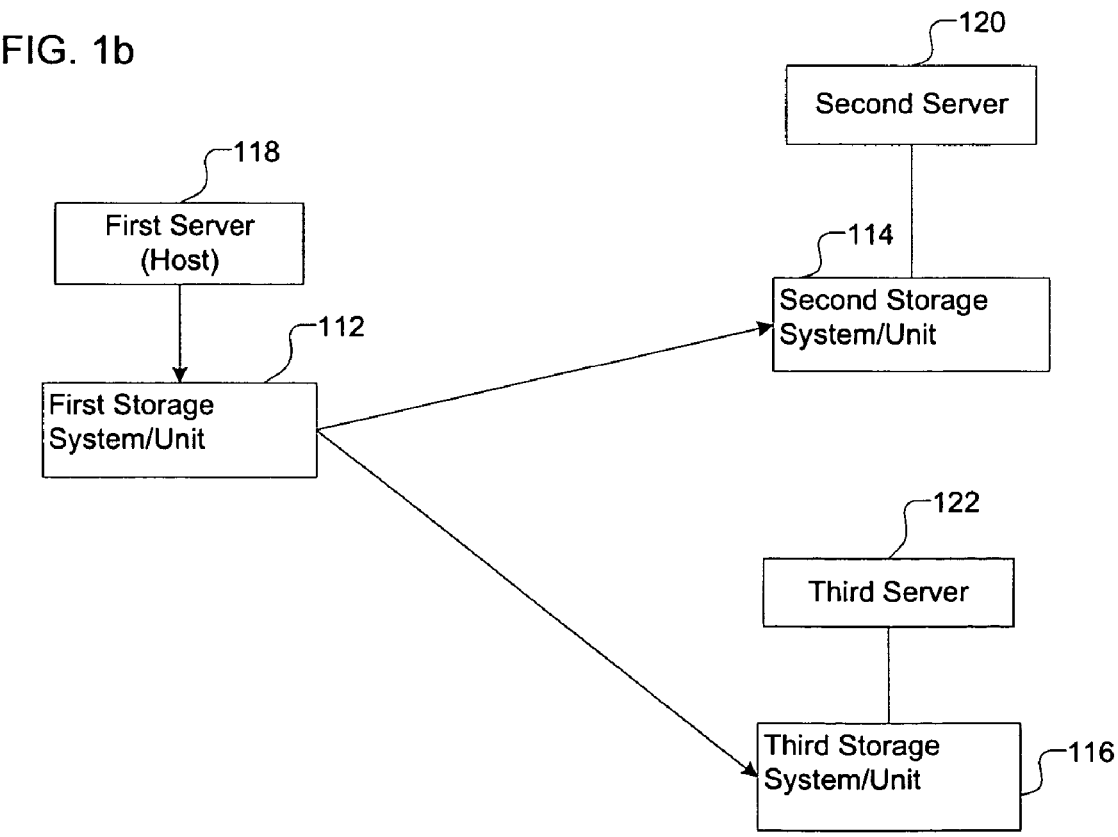
FIG. 1b illustrates a block diagram of a system for distributing data and parity information among three storage systems, in a accordance with certain embodiments.

FIG. 1b illustrates a block diagram of a system for distributing data and parity information among three storage systems, in a accordance with certain embodiments.

A first storage system 112, a second storage system 114, and a third storage system 116 are coupled to a first server 118, a second server 120, and a third server 122 respectively. The first server 118 may write data to the first storage system 112. The data may have to be protected against site outages. In certain embodiments, the data and associated parity may be stored in one or more of the first, second, and third storage systems 112, 114, 116. Further details of certain embodiments for storing the data and associated parity in one or more of the first, second, and third storage systems 112, 114, 116 are described in FIGS. 2-8.

Figure 2:
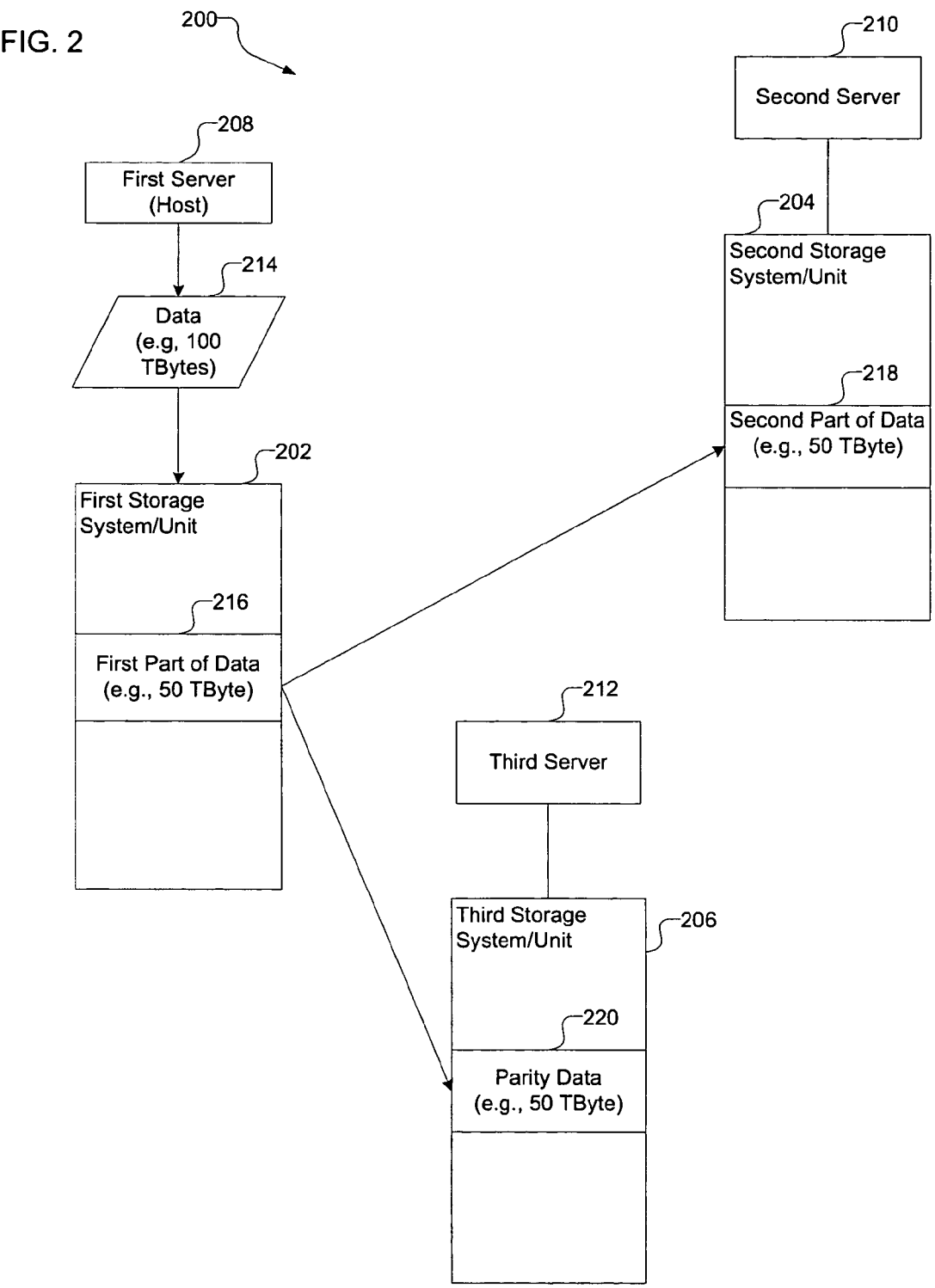
FIG. 2 illustrates a block diagram of a first computing environment for distributing data and parity information among three storage systems, in accordance with certain embodiments.

FIG. 2 illustrates a block diagram of a first computing environment 200 for distributing data and parity information among three storage systems, in accordance with certain embodiments.

A first storage system 202, a second storage system 204, and a third storage system 206 are coupled to a first server 208, a second server 210, and a third server 212 respectively. Additionally, the first storage system 202 is coupled to the second storage system 204 and the third storage system 206. The storage systems 202, 204, 206 may comprise any storage system or storage subsystem comprising a storage controller, a disk based storage, a tape based storage, etc. The servers 208, 210, 212 may comprise any type of computational device, such as, a workstation, a desktop computer, a laptop, a mainframe, a telephony device, a hand held computer, etc.

While performing write operations, the first server 208 may send data 214 to the first storage system 202. The data 214 may have to be protected against site outages. The first storage system 202 stores a first part 216 of the data 214 in the first storage system 202 and sends a second part 218 of the data 214 to the second storage system 204 for storage. The first storage system 202 computes parity data 220 from the first part 216 and the second part 218, and sends the parity data 220 to the third storage system 206 for storage. In certain embodiments, after data is sent from the first storage system 202, the first storage system 202 waits for acknowledgement from one of the remote, i.e., second or third, storage systems 204, 206. When the corresponding acknowledgement returns from either the second storage system 204 or the third storage system 206, the data is protected and the first storage system 202 returns an indication to the first server 208 that the write was successful. In this way, the writes may also be automatically load balanced. If the storage network to the second storage system 206 is busy, it may not adversely affect the performance of the first computing environment 200, because the first server 208 only has to wait for one of the writes to be acknowledged.

In certain embodiments, if the data 214 is hundred terabytes in size, then the first part 216 of data may be fifty terabytes, the second part 218 of data may be fifty terabytes, and the parity data 220 may be fifty terabytes. In comparison to FIG. 1 where twice the amount of storage was needed to store the original data 106 for recovering from disasters, the embodiment illustrated in FIG. 2 may require one and a half times the amount of storage as the size of the data 214 for recovering from disasters that cause a loss in any of the storage systems 202, 204, 206.

In certain embodiments, the first storage system 202, the second storage system 204, and the third storage system 206 may be at different sites. In certain embodiments, the first storage system 202 is located at a first site, the second storage system 204 is located at a second site, and the third storage system 206 is located at a third site, where the first site, the second site, and the third site are geographically separated from each other and may be in different cities. For example, the first, second, and third sites may each be separated from each other by a distance of over ten miles. Since the storage systems 202, 204, 206 are located in different sites, the first part 216 of data 214, the second part 218 of data 214, and the parity data 220 are stored in different disk storage systems. In certain embodiments, a user could choose to separate the storage systems 202, 204, 206 to protect against a site-wide disaster, such as, a natural disaster. However, the storage systems 202, 204, 206 may always be geographically dispersed. For example, the storage systems 202, 204, 206 may be in the same room, separated by a fireproof concrete wall, and connected to different power grids and sprinkler systems.

In an exemplary embodiment two sites comprising a local site and a remote site may separated by a distance of 100 km. The speed of light through a fibre is approximately 200,000 km/s. Assuming a distance of 100 km, the round trip latency between the two sites is 1 millisecond. A latency of an exemplary hard drive may be around 5 ms. If the data is read from or written to the cache of a remote storage subsystem at the remote site, then the access time from this setup may be a fifth of the access time of the exemplary hard drive. However, if the data is not in the remote cache, then the operation takes 6 ms instead of 5 ms, which causes a performance penalty of 20%. In an exemplary embodiment where the writes to the second and third storage subsystems 204, 206 occur in parallel, the write performance may be the same as the two-site setup, and the read performance may be no worse than 20%. In certain alternative embodiments, the write operation is not a full stride write. In such case, the storage subsystem needs to read the current data, add the new data, and calculate the new parity before writing. In certain embodiments, the parity data may be stored in the storage system with the fastest access time because the parity data may be accessed more frequently than other data. In another embodiment, the parity data may be distributed among the storage systems 202, 204, 206. Distributing the parity data may balance the workload more evenly between the three storage systems and can cause and improvement in the overall performance of the computing environment 200.

Figure 3:
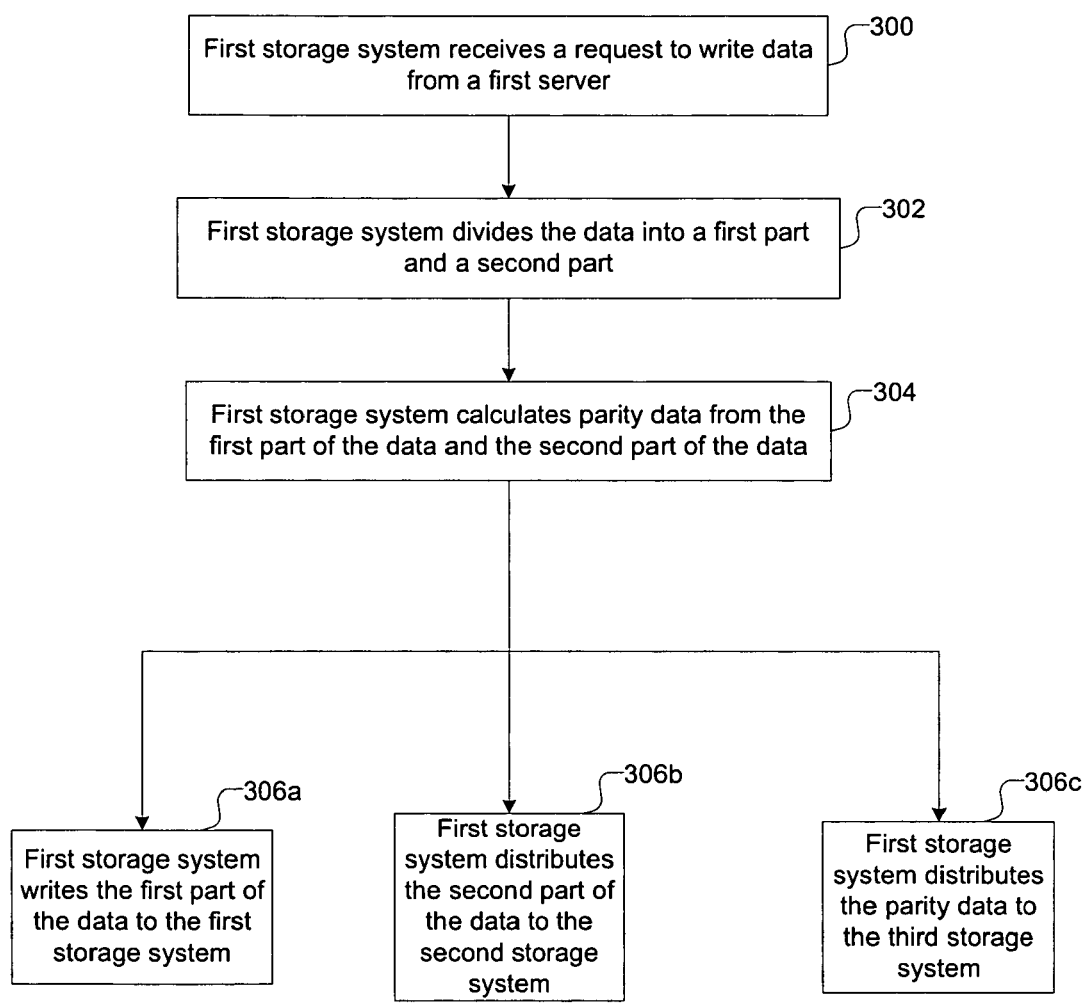
FIG. 3 illustrates operations for distributing data and parity information, in accordance with certain embodiments corresponding to the first computing environment.

FIG. 3 illustrates operations for distributing data and parity information, in accordance with certain embodiments corresponding to the first computing environment 200. The operations illustrated in FIG. 3 may be implemented in the first storage system 202.

Control starts at block 300, where the first storage system 202 receives a request to write the data 214 from the first server 208. The first storage system 202 divides (at block 302) the data into a first part 216 and a second part 218.

The first storage system 202 computes (at block 304) the parity data 220 from the first part 216 of the data and the second part 218 of the data. For example, a bitwise XOR operation of bytes of the first part 216 of the data and the second part of the data 218 may provide the parity data. In certain embodiments, the parity data 220 may be computed in a manner similar to the computation of parity data in RAID level 4. In alternative embodiments, the parity data 220 may be computed in a manner different from the computation of parity data in RAID level 4.

Control may proceed simultaneously to blocks 306a, 306b, and 306c from block 304, i.e., the operations described in blocks 306a, 306b, 306c may be performed in parallel. The first storage system 202 writes (at block 306a) the first part 216 of the data 214 to the first storage system 202. The first storage system 202 distributes (at block 306b) the second part 218 of the data 214 to the second storage system 218 for storage. The second storage system 204 may receive and store the second part 218 of the data. Additionally, the first storage system 202 distributes (at block 306c) the parity data 220 to the third storage system 206. The third storage system 206 may receive and store the parity data 220.

FIG. 3 illustrates an embodiment in which a first storage unit 202 at a first site is coupled to a second storage unit 206 at a second site and a third storage unit 206 at a third site. The first storage unit 202 receives the data 214, and divides the received data into a first part 216 and a second part 218. The first storage unit 202 stores the first part 216 of the data 214 in the first storage unit 202 at the first site. The first storage unit 202 distributes the second part 218 of the data to the second storage unit 204 at the second site for storage. The first storage unit 202 computes parity data 220 corresponding to the first part 216 of the data 214 and the second part 218 of the data 214. The first storage unit 202 distributes the parity data 220 to the third storage unit 204 at the third site for storage.

In certain embodiments, in response to a data loss at the first storage system 202 at the first site, the first part 216 of the data 214 may be recovered from the second part 218 of the data stored at the second storage system 204 and the parity data 220 stored at the third storage system 206. In certain embodiments, the distance between the first site and the third site is less than the distance between the first site and the second site, because the parity data 220 may be accessed and written to with a greater frequency compared to other data.

In certain embodiments, the sum of the size of the first part 216 of the data 214, the second part 218 of the data 214, and the parity data 220 is less than two times the size of the received data 214. In certain embodiments, the sum of the size of the first part 216 of the data 214, the second part 218 of the data 214, and the parity data 220 is one and a half times the size of the received data 214. In certain alternative embodiments, the parity data may be stored on the fastest accessible storage system, such as, the first storage system 202.

Figure 4:
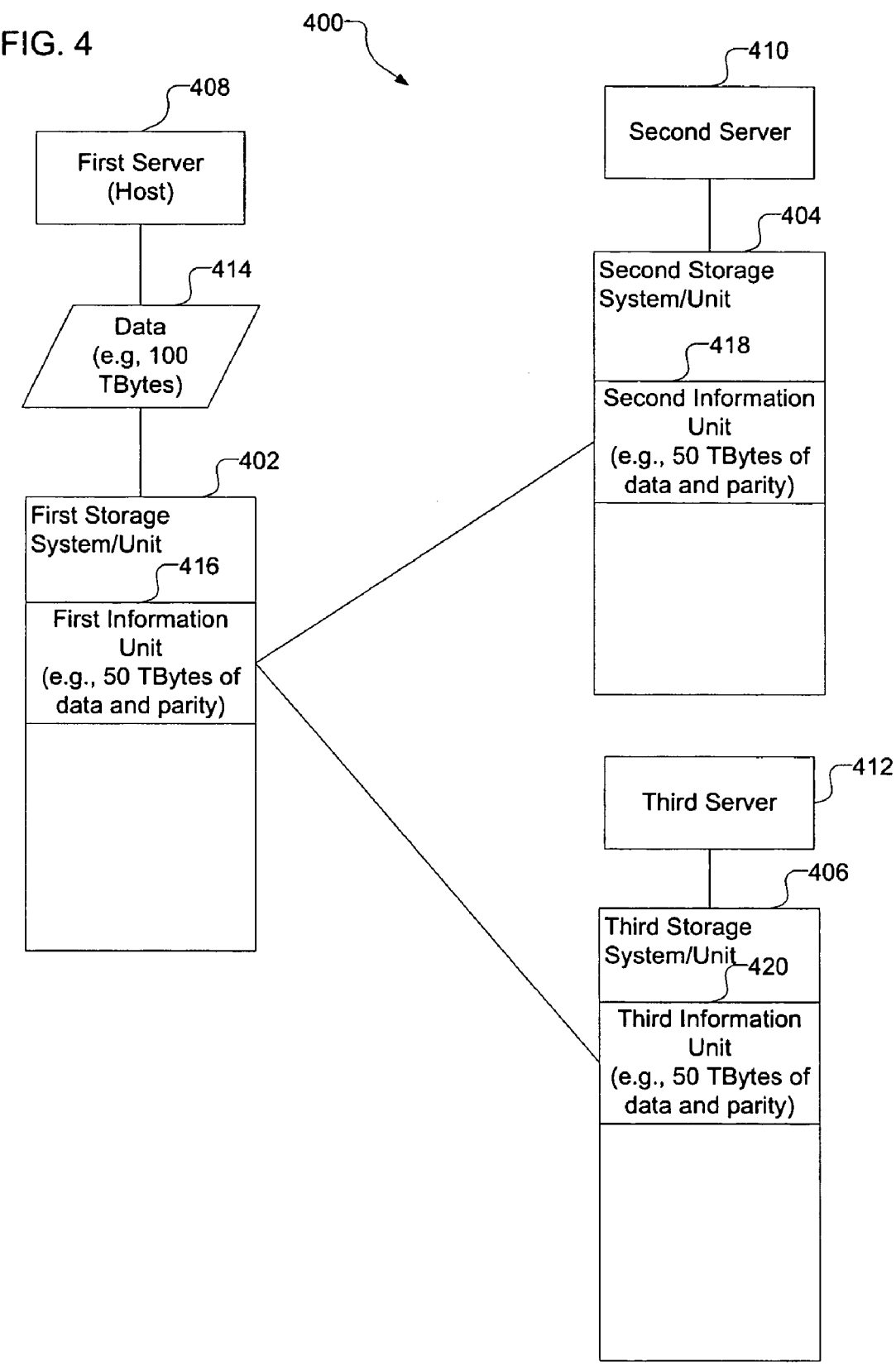
FIG. 4 illustrates a block diagram of a second computing environment for distributing data and parity information among three storage systems, in accordance with certain embodiments.

FIG. 4 illustrates a block diagram of a second computing environment 400 for distributing data and parity information among three storage systems, in accordance with certain embodiments.

A first storage system 402, a second storage system 404, and a third storage system 406 are coupled to a first server 408, a second server 410, and a third server 412 respectively. Additionally, the first storage system 402 is coupled to the second storage system 404 and the third storage system 406.

The first server 408 may send data 414 to the first storage system 402 via a write request. The data 414 may have to be protected against site outages. In certain embodiments, the first storage system 402 receives the data 414 from the first server 408, where the data 414 may be associated with the write request from the first server 408.

The first storage system 402 generates a first information unit 416, a second information unit 418, and a third information unit 420, where the first information unit 416, the second information unit 418, and the third information unit 420 each include a portion of the received data 414 and computed parity data. Each information unit 416, 418, 420 is comprised one or more bytes. The first storage unit 402 stores the first information unit 416 in the first storage system 402 at the first site. The first storage unit 408 distributes the second information unit 418 to the second storage system 204 at the second site for storage, and also distributes the third information unit 420 to the third storage system 406 for storage.

In certain embodiments, if the data 414 is hundred terabytes in size, then the first information unit 416 may be fifty terabytes, the second information unit 418 may be fifty terabytes, and the third information unit 420 may be fifty terabytes. In comparison to FIG. 1 where twice the amount of storage was needed to store the original data 106 for recovering from disasters, the embodiment illustrated in the computing environment 400 may require one and a half times the amount of storage as the size of the data 414, for recovering from disasters that cause a loss in any of the storage systems 402, 404, 406.

In certain embodiments, the first storage system 402 is located a first site, the second storage system 404 is located at a second site, and the third storage system 406 is located at a third site, where the first site, the second site, and the third site are geographically separated from each other and may be in different cities. The first information unit 416, the second information unit 418, and the third information unit 420 may be stored in different disk systems.

Figure 5:
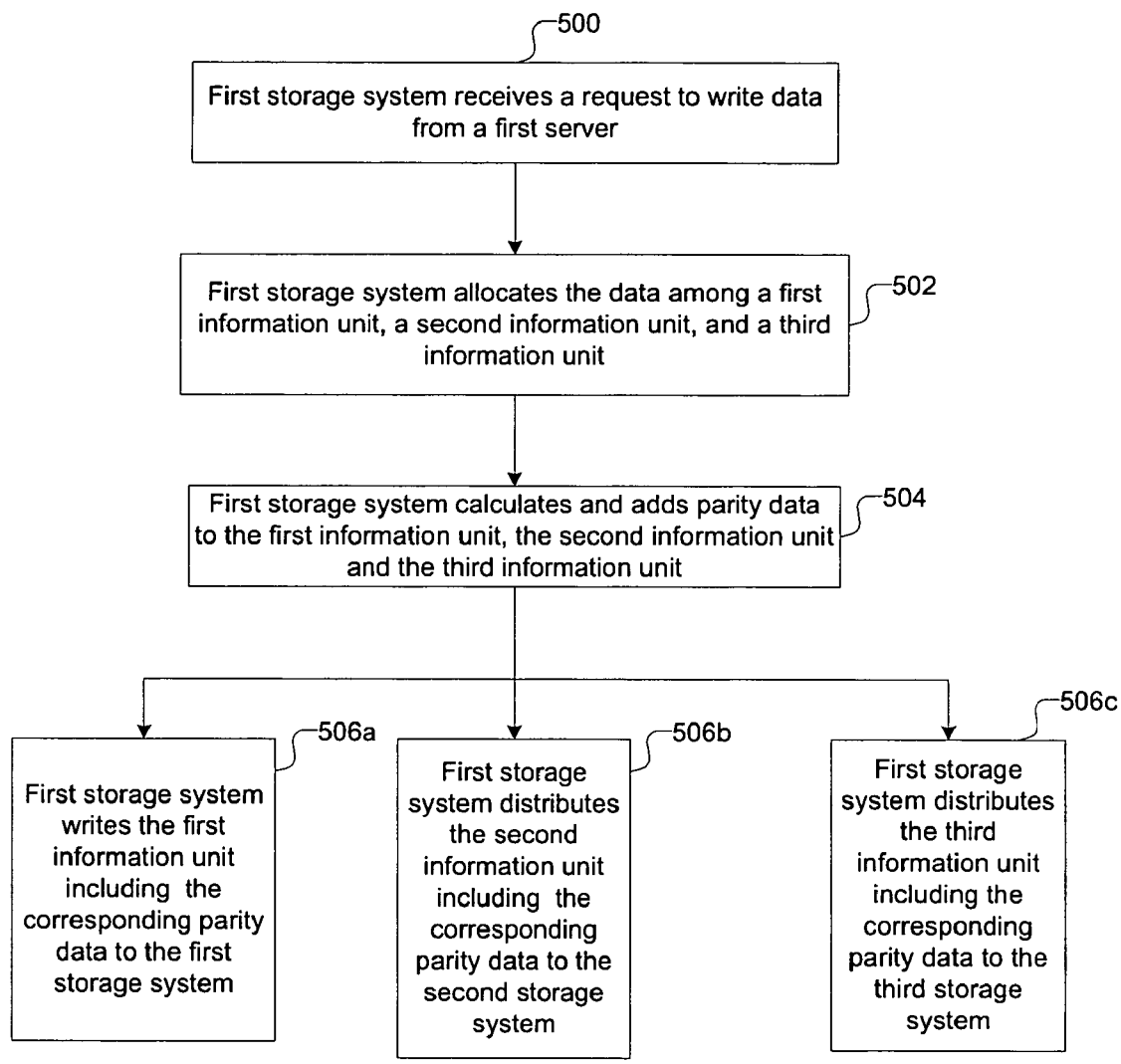
FIG. 5 illustrates operations for distributing data and parity information, in accordance with certain embodiments corresponding to the second computing environment.

FIG. 5 illustrates operations for distributing data and parity information, in accordance with certain embodiments corresponding to the second computing environment 400. The operations illustrated in FIG. 5 may be implemented in the first storage system 402.

Control starts at block 500, where the first storage system 402 receives a request to write data 414 from the first server 408. The first storage system 402 allocates (at block 502) the data 414 among a first information unit 416, a second information unit 418, and a third information unit 420.

The first storage system 402 calculates and adds (at block 504) parity data to the first information unit 416, the second information unit 418 and the third information unit 420. In certain embodiments, the first storage system 402 may compute parities in a manner similar to RAID level 5, where each of the three information units 416, 418, 420 include a part of the received data 414 and at least some parity data. The allocation and addition of parity data may be performed by using algorithms different from those used in RAID level 5.

Control may proceed simultaneously to blocks 506a, 506b, and 506c from block 504, i.e., the operations described in blocks 506a, 506b, 506c may be performed in parallel. The first storage system writes (at block 506a) the first information unit 416 including the corresponding parity data to the first storage system 416. Simultaneously, the first storage system 402 distributes (at block 506b) the second information unit 418 including the corresponding parity data to the second storage system 404. Additionally, the first storage system 402 writes the third information unit 420 including the corresponding parity data to the third storage system 406.

In certain embodiments that provide fault tolerance, the parity data corresponding to data stored in a storage system is stored in other storage systems. For example, the parity data for data stored in the first storage system 402 is stored in the second storage system 404 and the third storage system 406, the parity data for data stored in the second storage system 404 is stored in the first storage system 402 and the third storage system 406, and the parity data for data stored in the third storage system 406 is stored in the first storage system 402 and the second storage system 404.

In certain embodiments, in the event of a data loss at the first site, the received data 414, is recovered from the second information unit 418 and the third information unit 420. In certain embodiments, the sum of the size of the first information unit 416, the second information unit 418, and the third information unit 420 is less than two times the size of the received data 414. In certain embodiment, the first information unit 416, the second information unit 418, and the third information unit 420 are stored in different disk storage systems.

Figure 6:
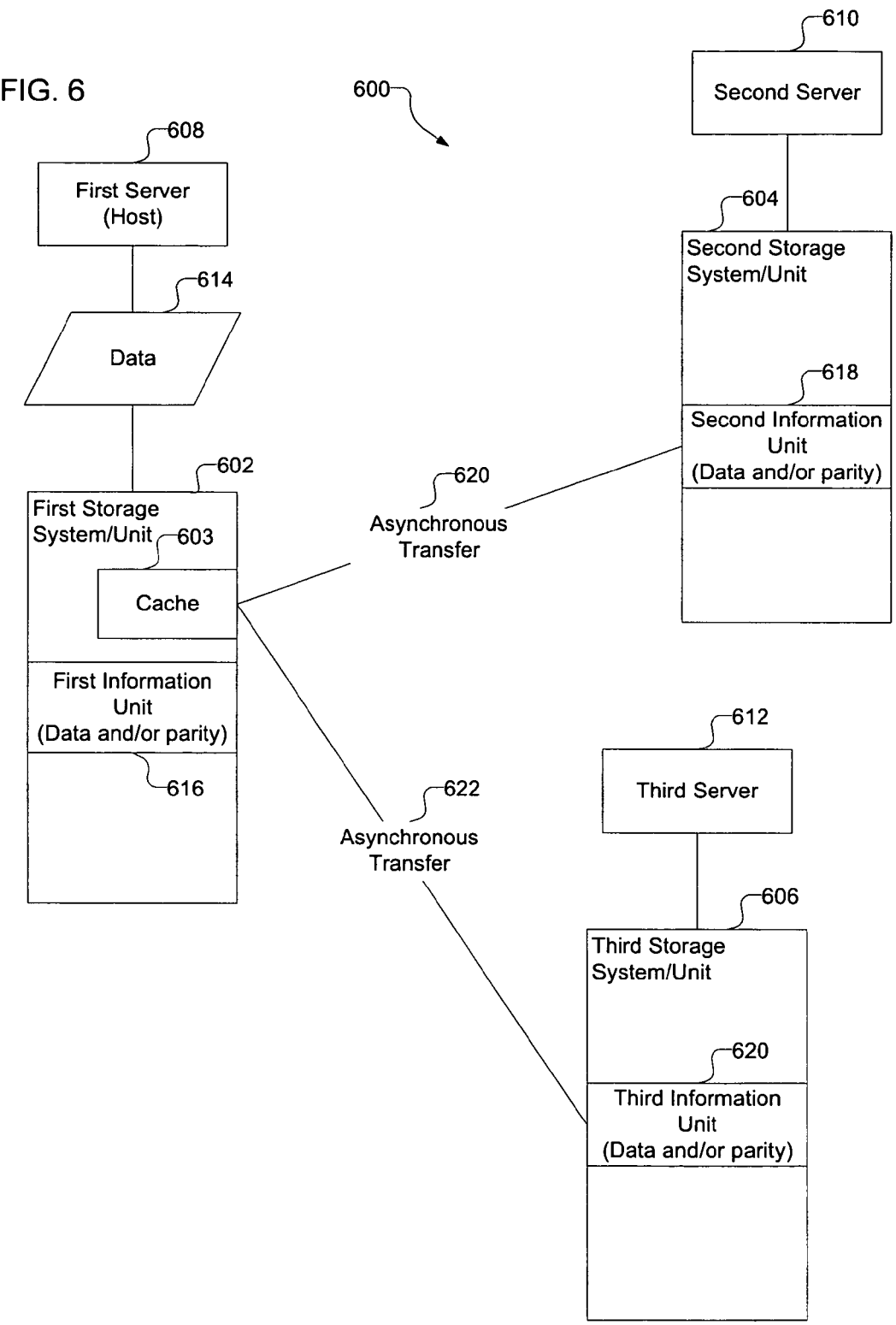
FIG. 6 illustrates a block diagram of a third computing environment for distributing data and parity information among three storage systems, in accordance with certain embodiments.

FIG. 6 illustrates a block diagram of a third computing environment 600 for distributing data and parity information among three storage systems, in accordance with certain embodiments.

A first storage system 602 including a cache 603, a second storage system 604, and a third storage system 606 are coupled to a first server 608, a second server 610, and a third server 612 respectively. Additionally, the first storage system 602 is coupled to the second storage system 604 and the third storage system 606. In certain embodiments, the first storage system 602, the second storage system 604, and the third storage system 608 may be at different sites that are geographically dispersed.

The first server 608 may send data 614 to the first storage system 602 via a write request. The data 614 may have to be protected against site outages. The first storage system 602 receives the data 614 and writes the received data into the cache 603 for temporary storage. The first storage system 602 may generate a first information unit 616, a second information unit 618, and a third information unit 620, where the first information unit 616, the second information unit 618, and the third information unit 620 each include a portion of the received data 614 stored temporarily in the cache 603 and computed parity data. The first storage system 602 stores the first information unit 616 in the first storage system 602 at a first site. The first storage system 602 distributes via an asynchronous transfer 620 the second information unit 418 to the second storage system 604 at a second site for storage, and also distributes via an asynchronous transfer 622 the third information unit 620 to the third storage system 606 at a third site for storage. The distributions are asynchronous because the received data 614 is not used immediately to calculate and distribute the information units 618, 620 to the second storage system 604 and the third storage system 606, i.e., the write operation from the first server 608 to the first storage system 602 can complete without distributing the corresponding data among the three storage units 602, 604, 606.

Figure 7:
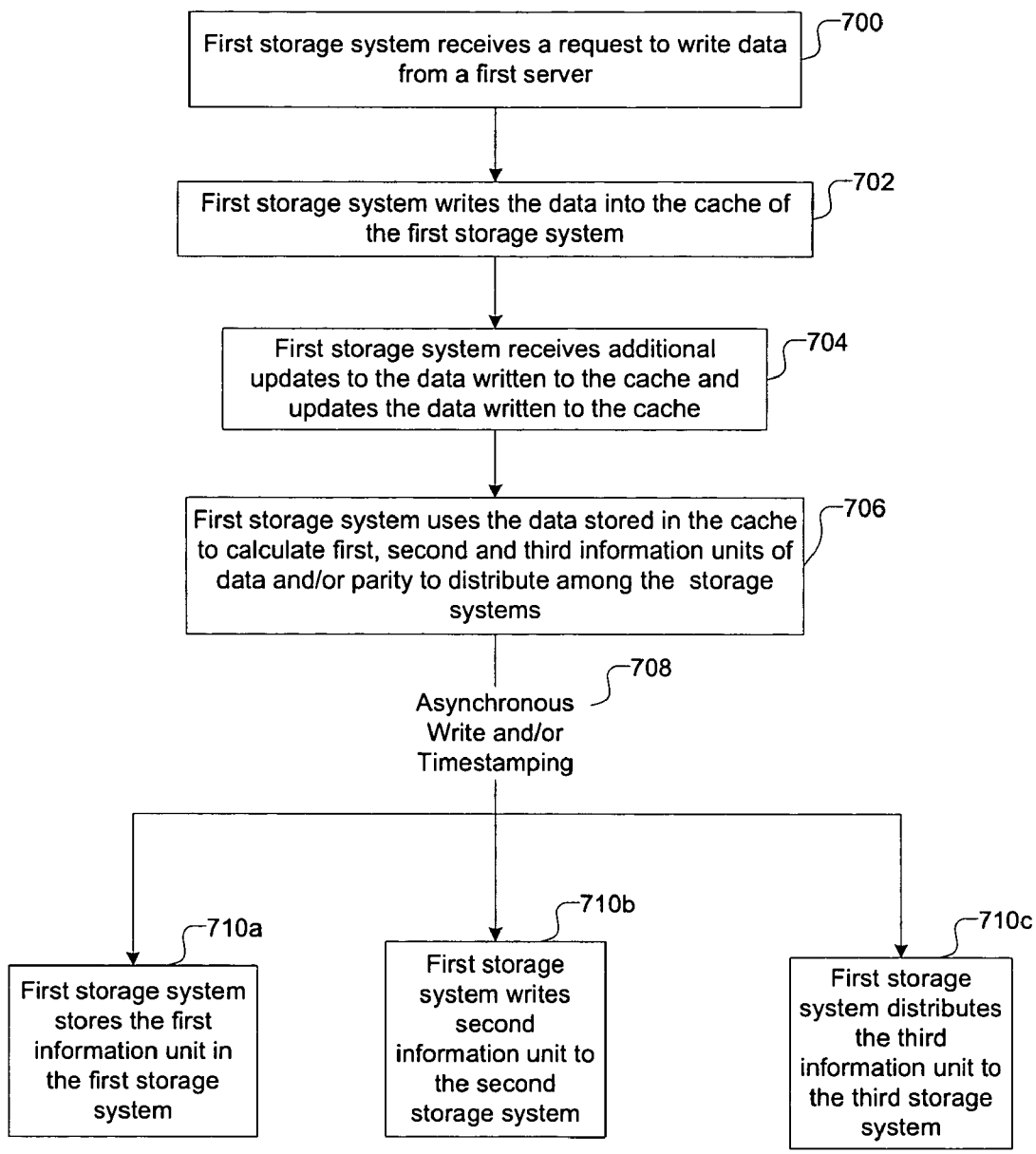
FIG. 7 illustrates operations for distributing data and parity information, in accordance with certain embodiments corresponding to the third computing environment.

FIG. 7 illustrates operations for distributing data and parity information, in accordance with certain embodiments corresponding to the third computing environment 600. The operations illustrated in FIG. 7 may be implemented in the first storage system 602.

Control starts at block 700, where the first storage system 602 receives a request to write data from a first server 608. The first storage system 602 writes (at block 702) the data 614 into the cache 603 of the first storage system 602. The first storage system 602 receives additional updates to the data 614 written to the cache 603 and updates (at block 704) the data written to the cache 603.

The first storage system 602 uses the data stored in the cache 603 to calculate (at block 706) first, second and third information units 616, 618, 620 to distribute among the storage systems 602, 604, 606, where each of the first, second, and third information units 616, 618, 620 may include parts of the received data 614, parts of the additional updates, and computed parity data.

Control may proceed simultaneously to blocks 710a, 710b, and 710c from block 706, i.e., the operations described in blocks 710a, 710b, 710c may be performed in parallel. During the transfer of control from block 706 to blocks 710a, 710b, 710c, the first storage system 602 asynchronously initiates data transfer operations and may timestamp the associated data (reference numeral 708).

The first storage system 602 writes (at block 710a) the first information unit 616 including the corresponding parity data to the first storage system 602. Simultaneously, the first storage system 602 asynchronously distributes (at block 710b)

the second information unit 618 including the corresponding parity data to the second storage system 604 for storage. Additionally, the first storage system 602 distributes the third information unit 620 including the corresponding parity data to the third storage system 606 for storage.

By distributing the data and parity to storage systems asynchronously, all writes are initially written to the cache of a local storage system, such as storage system 602. Then, when time permits the data is distributed to the other two storage systems. If the same data block gets updated before the data is distributed to the other two storage subsystems, then only the latest change needs to be sent. The earlier changes do not need to be distributed and bandwidth is saved. Furthermore, by timestamping the distributed writes, the two remote systems 604, 606 are consistent even if the local system 602 fails. The local system 602 may have the similar performance characteristics as a non-distributed storage subsystem, and at the same time provide disaster recovery protection.

In certain embodiments, the first server 608 may be a host computer, and an update from the host 608 to the first storage unit 602 is asynchronously reflected at the second storage unit 604 and asynchronously reflected at the third storage unit 606.

In certain embodiments, where the first storage unit 602 includes the cache 603, the first storage unit 602 may store the received data 614 in the cache 603 in the first storage unit 602. Prior to dividing the received data 614 into information units, the first storage unit 602 may receive updates to the data stored in the cache 603. The first storage unit 602 may update the cache 603 with the received updates, wherein distributing the second information unit 618 and the third information unit 620 are performed asynchronously, and wherein the first information unit 616, the second information unit 616 and the third information unit 620 are timestamped. In certain embodiments, the parity data may be distributed among the three information units 616, 618, 620, whereas in other embodiments the parity data may reside in a single information unit, such as information unit 620.

In certain embodiments, a majority of the parity data is stored in the first storage unit 602, wherein the first storage unit 602 is accessible faster than the second and third storage units 604, 606. In certain additional embodiments, the data 614 is received at the first storage unit from the host 608, and wherein multi-pathing hardware is used to connect the host 608 to the first, second, and third storage units 602, 604, 606. All the storage units 602, 604, 606 may present the same volume to the host 608. If one of the storage units 602, 604, 606 fail one of the other storage units may dynamically rebuild and continue to present the volume to the host. As a result, storage system failures may not disrupt the operation of the computing environment 600.

In certain embodiments, distributing the second and third information units 618, 620 is via write operations from the first storage unit 602 to the second and third storage units 604, 606, and wherein the write operations from the first storage unit 602 to the second and third storage units 604, 606 are full stride writes that are written in parallel to the second and third storage units 604, 606.

In certain embodiments, the operations performed in the computing environment 600 may also be performed in the computing environment 200 or 400. For example, full stride writes may be performed in the computing environment 200 or 400. Additionally, certain operations described above may be performed in one or more of computing environments 200, 400, 600.

Certain embodiments described in FIGS. 1b, 2-7 reduce the amount of storage required for disaster recovery in comparison to embodiments where a full copy of the original data 106 is kept at the disaster recovery site 104. In certain embodiments, the amount of storage required for disaster recovery is less than twice the size of the original data (represented by reference numerals 106, 214, 414). In certain embodiments, the amount of storage required for disaster recovery is one and a half times the size of the original data 106, 214, 414.

In alternative embodiments, additional storage units may be added at additional sites. In certain embodiments, the hosts 208, 408, 608 may have paths to all the storage systems, i.e., the first, second, and third storage systems, using multi-pathing hardware. All the storage systems may present the same volume to the host 208, 408, 608. If one of the storage systems fail, one of the other storage systems that has not failed is capable of dynamically rebuilding and continuing to present the same volume to the host 208, 408, 608. As a result, certain embodiments can recover non-disruptively from system failures.

In certain embodiments all writes can be full stride writes that incur no RAID-5 write penalties. In certain embodiments both backup and disaster recovery may be performed by the embodiments. Asynchronous remote mirroring may be used to enhance the performance of certain embodiments. The embodiments store parity information in one or more geographically dispersed sites in a three site solution to perform disaster recovery.

Additional Embodiment Details

The described techniques may be implemented as a method, apparatus or article of manufacture involving software, firmware, micro-code, hardware and/or any combination thereof. The term "article of manufacture" as used herein refers to program instructions, code and/or logic implemented in circuitry (e.g., an integrated circuit chip, Programmable Gate Array (PGA), ASIC, etc.) and/or a computer readable medium (e.g., magnetic storage medium, such as hard disk drive, floppy disk, tape), optical storage (e.g., CD-ROM, DVD-ROM, optical disk, etc.), volatile and non-volatile memory device (e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.). Code in the computer readable medium may be accessed and executed by a machine, such as, a processor. In certain embodiments, the code in which embodiments are made may further be accessible through a transmission medium or from a file server via a network. In such cases, the article of manufacture in which the code is implemented may comprise a transmission medium, such as a network transmission line, wireless transmission media, signals propagating through space, radio waves, infrared signals, etc. Of course, those skilled in the art will recognize that many modifications may be made without departing from the scope of the embodiments, and that the article of manufacture may comprise any information bearing medium known in the art. For example, the article of manufacture comprises a storage medium having stored therein instructions that when executed by a machine results in operations being performed.

Figure 8:
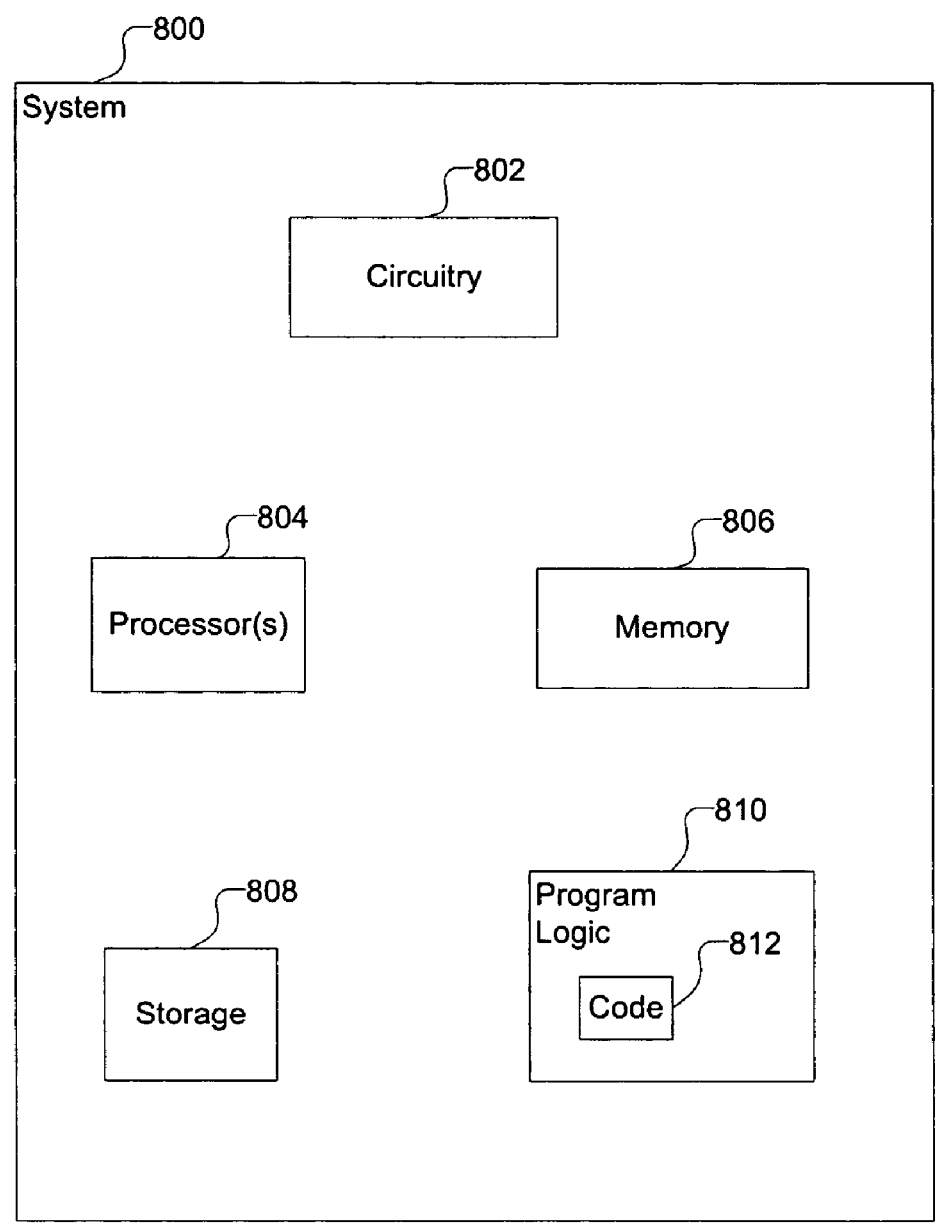
FIG. 8 illustrates a system in which certain embodiments are implemented.

FIG. 8 illustrates a block diagram of a system 800 in which certain embodiments may be implemented. In certain embodiments, the storage systems 202, 402, 602 may be implemented in accordance with the system 800. The system 800 may include a circuitry 802 that may in certain embodiments include a processor 804. The system 800 may also include a memory 806 (e.g., a volatile memory device), and storage 808. Certain elements of the system 800 may or may not be found in the storage systems 202, 402, 602. The storage 808 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 808 may comprise an internal storage device, an attached storage device and/or a network accessible storage device. The system 800 may include a program logic 810 including code 812 that may be loaded into the memory 806 and executed by the processor 804 or circuitry 802. In certain embodiments, the program logic 810 including code 812 may be stored in the storage 808. In certain other embodiments, the program logic 810 may be implemented in the circuitry 802. Therefore, while FIG. 8 shows the program logic 810 separately from the other elements, the program logic 810 may be implemented in the memory 806 and/or the circuitry 802.

At least certain of the operations of FIGS. 3, 5, and 7 may be performed in parallel as well as sequentially. In alternative embodiments, certain of the operations may be performed in a different order, modified or removed.

Furthermore, many of the software and hardware components have been described in separate modules for purposes of illustration. Such components may be integrated into a fewer number of components or divided into a larger number of components. Additionally, certain operations described as performed by a specific component may be performed by other components.

The data structures and components shown or referred to in FIGS. 1a, 1b, 2-8 are described as having specific types of information. In alternative embodiments, the data structures and components may be structured differently and have fewer, more or different fields or different functions than those shown or referred to in the figures. Therefore, the foregoing description of the embodiments has been presented for the purposes of illustration and description. It is not intended to be exhaustive or to limit the embodiments to the precise form disclosed. Many modifications and variations are possible in light of the above teaching.

What is claimed is:

1. A method, comprising:
   receiving data at a first storage unit;
   generating a first information unit, a second information unit, and a third information unit, wherein the first information unit, the second information unit, and the third information unit each include a portion of the received data and computed parity data;
   storing the first information unit in the first storage unit at a first site;
   distributing the second information unit to a second storage unit at a second site for storage; and
   distributing the third information unit to a third storage unit at a third site for storage, wherein a majority of the parity data is stored in the first storage unit.

2. The method of claim 1, wherein the first storage unit is coupled to a host that sends Input/Output requests to the first storage unit.

3. The method of claim 1, further comprising:
   in response to a data loss at the first site, recovering the received data from the second information unit and the third information unit.

4. The method of claim 3, wherein a sum of a size of the first information unit, the second information unit, and the third information unit is less than two times the received data size.

5. The method of claim 4, wherein the first site, the second site, and the third site are separated from each other by a distance of over ten miles, and wherein the first information unit, the second information unit, and the third information unit are stored in different storage disk systems.

6. The method of claim 1, wherein the data is received at the first storage unit from a host, and wherein multi-pathing hardware is used to connect the host to the first, second, and third storage units.

7. The method of claim 1, wherein distributing the second and third information units is via write operations from the first storage unit to the second and third storage units.

* * * * *